United States Patent [19]
Hood et al.

[11] Patent Number: 5,814,286
[45] Date of Patent: Sep. 29, 1998

[54] APPARATUS FOR SEPARATING SOLVENT IN A FEED OF SOLVENT AND DEASPHALTED OIL

[75] Inventors: Richard L. Hood, Edmond, Okla.; Philip B. Rettger, Walnut Creek, Calif.; Lucien Y. Bronicki, Yavne, Israel

[73] Assignee: Ormat Process Technologies, Inc., Israel

[21] Appl. No.: 701,477

[22] Filed: Aug. 22, 1996

[51] Int. Cl.⁶ .......................... B01D 17/02; B01D 11/04
[52] U.S. Cl. .......................... 422/256; 196/14.52
[58] Field of Search .................. 422/256; 196/14.52; 210/800

[56] References Cited

U.S. PATENT DOCUMENTS

| | | | |
|---|---|---|---|
| 3,552,554 | 1/1971 | Olgard | 210/519 |
| 4,326,953 | 4/1982 | Gibby et al. | 210/168 |
| 4,479,875 | 10/1984 | Nelson . | |
| 4,559,141 | 12/1985 | Gyulavari | 210/521 |
| 4,643,834 | 2/1987 | Batutis | 210/740 |
| 4,784,753 | 11/1988 | Hotier et al. . | |
| 4,844,801 | 7/1989 | Szanto | 210/205 |
| 5,126,039 | 6/1992 | Silander | 209/270 |
| 5,695,655 | 12/1997 | Smati | 210/800 |

*Primary Examiner*—Mary E. Mosher
*Attorney, Agent, or Firm*—Donald M. Sandler

[57] ABSTRACT

Apparatus for separating solvent in a feed of solvent and deasphalted oil produced in a deasphalting process includes a feed line for receiving the feed and constructed and arranged to produce a stream of fluid containing supercritical solvent and deasphalted oil. A substantially horizontally disposed inlet line receives the stream of fluid and is designed to effect two phase laminar flow at the outlet of the inlet line. The two phase laminar flow has a substantially horizontally disposed interface that divides the stream into an upper part containing the lighter supercritical solvent which floats on a lower part containing the heavier deasphalted oil.

21 Claims, 14 Drawing Sheets

FIG. 14 ical solvent deasphalting plant showing the conversion of a feed of residual oil from a refinery, for example, into a product stream of asphaltene and deasphalted oil;

5,814,286

1
APPARATUS FOR SEPARATING SOLVENT IN A FEED OF SOLVENT AND DEASPHALTED OIL

FIELD OF THE INVENTION

This invention relates to a method of and apparatus for separating solvent in a feed of solvent and deasphalted oil produced by a deasphalting process.

BACKGROUND OF THE INVENTION

A by-product of refineries that process crude oil into economically valuable light hydrocarbons, such as gasoline, is a heavy viscous, hydrocarbon called residual oil that often is further processed in a solvent deasphalting plant. In such a plant, residual oil is contacted with a solvent, such as propane, i-butane, n-butane, or pentane, under conditions of temperature and pressure which separates the feed into two liquid streams. One stream contains deasphalted oil (DAO) and most of the solvent, and the other contains asphaltene and the remainder of the solvent. The solvent in the two streams produced by the separator is recovered in a solvent recovery unit and used again; and although the asphaltene product is of relatively limited value, the DAO product is very valuable because it can be cycled back to the refinery and converted into gasoline or the like.

Some solvent recovery units operate under conditions of temperature and pressure at which the solvent in the stream of DAO and solvent is supercritical. In its supercritical state, the solvent, although a liquid, has a density much lower than that of the DAO, and behaves almost as a gas. As a consequence, the stream of supercritical solvent and DAO acts as a two-phase fluid.

Conventionally, a supercritical solvent recovery unit utilizes a pressure vessel that receives the feed of DAO and solvent through a nozzle which effects even distribution of solvent and DAO across the cross-sectional area of the vessel. Such distribution is often accompanied by turbulence that causes mixing of the supercritical solvent with the DAO, and complicates separation and recovery of the solvent.

U.S. Pat. No. 4,479,875 discloses a nozzle for introducing fluids of different densities into a calm fluid in a vessel without causing excessive turbulence and "carry-over" of high density fluid into the low density fluid. While excessive turbulence and high "carry-over" are eliminated, a significant pressure drop is introduced and this results in a remixing of the two phases.

The result is that the pressure vessel must be sufficiently large to permit re-separation to occur so that the solvent and DAO then can be drawn off separately. Consequently, for a given through-put, the separator vessel must be designed with a diameter sufficiently large to permit the supercritical solvent and DAO to again separate after the two-phase fluid is introduced into the separator.

It is therefore an object of the present invention to provide a new and improved method of and apparatus for separating solvent in a feed of supercritical solvent and deasphalted oil which is more efficient in capital cost and physical size than conventional methods and apparatus.

BRIEF DESCRIPTION OF THE INVENTION

The present invention provides apparatus for separating solvent in a feed of solvent and deasphalted oil produced in a deasphalting process including a feed line for receiving the feed and constructed and arranged to produce a main stream

2
of fluid containing supercritical solvent and deasphalted oil. A substantially horizontally disposed inlet line receives the main stream of fluid and is designed to effect two phase laminar flow at the outlet of the inlet line. The two phase laminar flow of feed establishes a substantially horizontally disposed interface that divides the main stream into an upper part containing the lighter supercritical solvent which floats on a lower part containing the heavier deasphalted oil.

The invention also includes at least one divider member at the outlet of said inlet line facing the stream. This divider member has a tapered leading edge whose apex can be located at substantially the same elevation as the interface between supercritical solvent and the deasphalted oil for mechanically separating the main stream into an upper flow stream containing essentially only supercritical solvent, and a lower flow stream containing deasphalted oil with a significantly reduced amount of solvent.

In one embodiment of the invention, at least one substantially horizontal, axially extending tube is provided. One end of this tube internally receives both the upper and lower flow streams, and the other end of the tube is capped. The upper surface of the tube has holes distributed axially along the length of the tube for effecting egress of fluid (essentially all solvent) from the upper flow stream, and the lower surface of said tube is apertured for effecting egress of fluid (essentially all DAO) from the lower flow stream. The lower surface of said tube may have holes distributed axially along the length of the tube, or simply may have a relatively large single aperture.

In another embodiment of the invention, the tube is provided with an axially extending separator baffle that divides the tube into an upper chamber into which flows said upper flow stream, and a lower chamber into which flows said lower flow stream thus maintaining segregation between the upper and lower streams. In such case, the upper and lower surfaces of the tube have holes distributed axially along the length of the tube for effecting egress of fluid from the upper flow stream, and the lower surface of said tube is apertured for effecting egress of fluid from the lower flow stream.

In another embodiment of the invention, a first substantially horizontally disposed axially extending tube receives the upper flow stream, and a second substantially horizontally disposed axially extending tube receives the lower flow stream. The upper surface of each tube has holes distributed axially along the length of the tube for effecting egress of fluid, and the lower surface of each tube is apertured for effecting egress of fluid from the tube.

BRIEF DESCRIPTION OF THE DRAWINGS

Embodiments of the present invention are described by way of example with reference to the accompanying drawings wherein.

DETAILED DESCRIPTION

Figure 1:
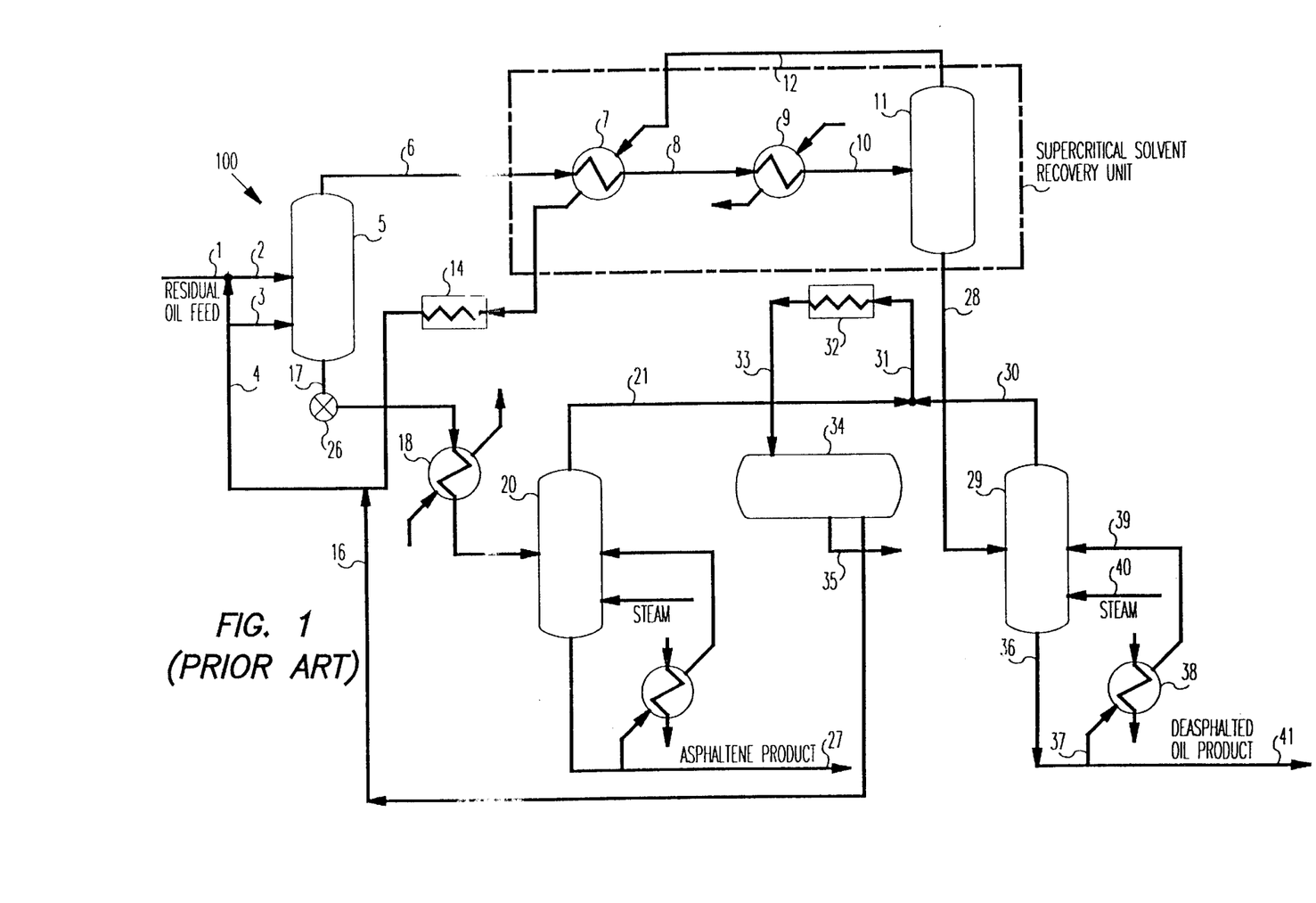
FIG. 1 is a schematic block diagram of a conventional supercritical solvent deasphalting plant showing the conversion of a feed of residual oil from a refinery, for example, into a product stream of asphaltene and deasphalted oil.

Turning now to the drawings, reference numeral 100 designates a conventional supercritical solvent deasphalting plant showing the conversion of feed 1 of residual oil from a refinery, for example, into asphaltene product stream 27 and deasphalted oil product stream 41. Residual oil in line 1 is combined with solvent (e.g., propane) in line 4, for example, producing in line 2, a stream of solvent and residual oil that is applied to asphaltene separator 5 which typically operates slightly above, or slightly below the critical pressure of the solvent and at temperature which is in the range about 100° F. below to about 100° F. above the critical temperature of the solvent. In the separator, the residual oil separates into a mixture of lighter deasphalted oil and heavier asphaltene. A lighter stream of deasphalted oil and most of the solvent passes out the overhead of the separator into line 6, and a heavier stream of asphaltene and solvent passes out the bottom of the separator in line 17. Valve 26 in line 17 regulates the operation of separator 5.

Heat exchangers 7 and 9 further heat the stream in lines 6 and 8 causing the solvent in the stream to reach a temperature and pressure at which the solvent is in supercritical condition. Although in a liquid state, the supercritical solvent behaves as if it were a gas; and the stream of supercritical solvent and DAO exiting heat exchanger 9 is a two-phase flow that is applied to supercritical solvent recovery separator 11 via feed line 10. Within separator 11, the solvent coalesces separately from the DAO, and mostly liquid solvent comes out the top of the separator into line 12, and DAO and some solvent comes out the bottom of the separator into line 28. Heat exchangers 7 and 9 and separator 11 substantially comprise a supercritical solvent recovery unit of the solvent deasphalting plant.

The supercritical hot solvent in line 12 is returned to separator 5 after first removing heat from the solvent to return it to its subcritical state. This is achieved by first passing the supercritical solvent through heat exchanger 7 where some of the heat is given up to the solvent and DAO mixture in line 6, and then passing the cooled solvent through cooler 14.

The mixture of mostly DAO and solvent in line 28 is applied to stripper 29 wherein steam from line 40 vaporizes the solvent. Vaporized solvent exits the stripper at the top in line 30, and DAO that remains is drawn off at the bottom of the stripper in line 36. Some of the DAO is cycled back to the stripper via lines 37 and 39 after being reheated at 38 in order to further reduce the amount of residual solvent in the DAC. The balance of the DAO, substantially free of solvent, is drawn off as product in line 41. This valuable product may be cycled back to a refinery where it can be converted into gasoline or the like.

Asphaltene in the mixture of asphaltene and solvent that passes out of the separator in line 17 is recovered by first heating the mixture at 18 and then applying the mixture to stripper 20 which operates essentially like stripper 29 producing vaporized solvent in line 21 and substantially solvent free asphaltene product in line 27.

Finally, vaporized solvent in line 21 produced by asphaltene stripper 20 and vaporized solvent in line 30 produced by DAC stripper 29 are combined at 31, cooled and condensed in condenser 32, and returned to solvent drum 34. Sour water in the solvent drum from condensed steam is removed at 35, and line 16 provides make-up solvent to separator 5.

Figure 2:
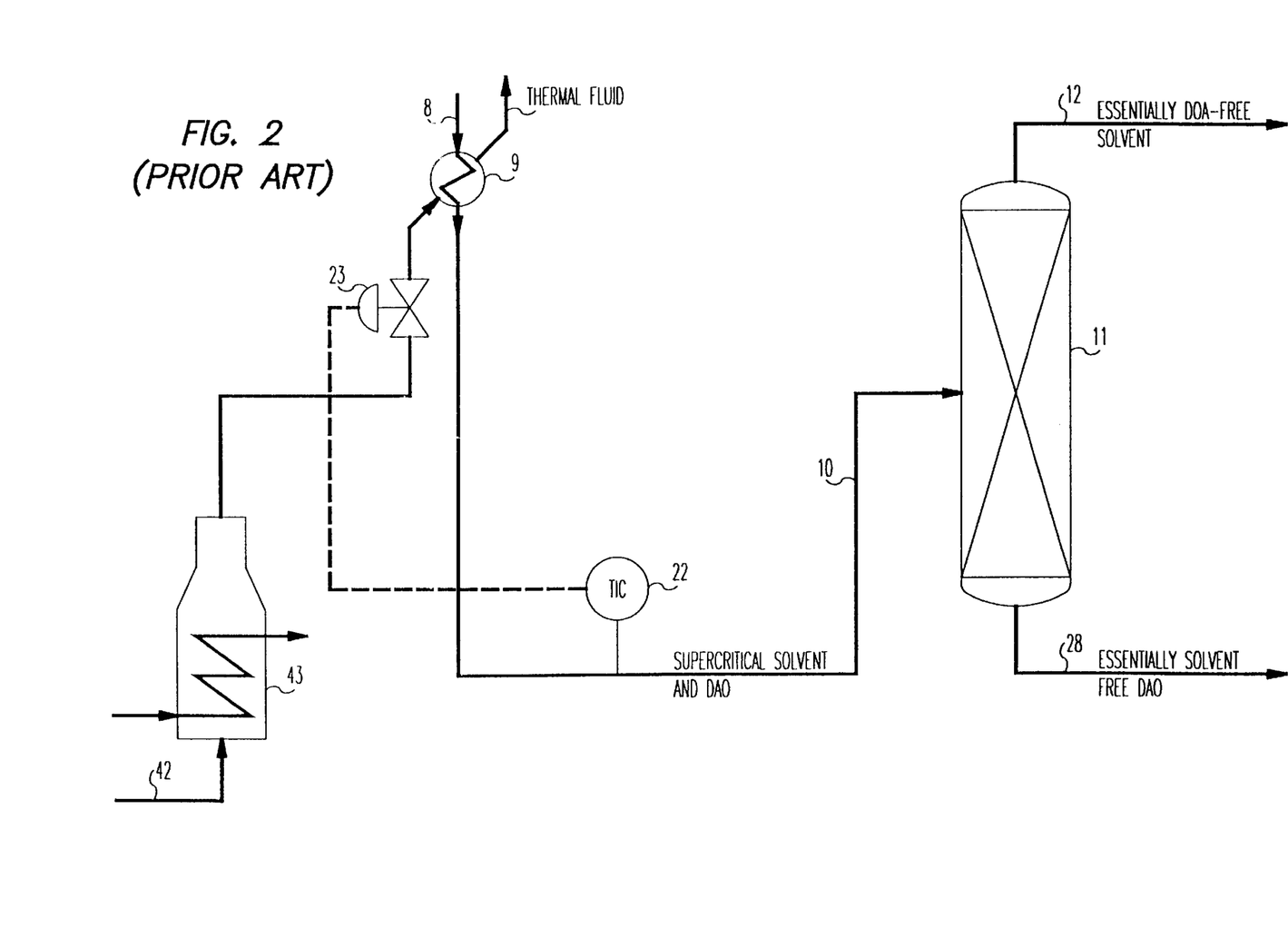
FIG. 2 is a detail of the solvent recovery unit of the plant shown in FIG. 1.

In order to establish a supercritical condition for the solvent in the DAO and solvent feed in line 10, a feedback arrangement like that shown in FIG. 2 can be utilized. That is to say, temperature sensor 22 in line 10 senses the temperature of the fluid in the line and adjusts flow control valve 23 which controls the mass flow of thermal fluid 42 from heat exchanger 43 through heat exchanger 9. The set-point temperature of sensor 22 corresponds to a temperature which is at or slightly above the critical temperature of the solvent; and in this manner, the solvent flowing in line 10 enters separator 11 at critical conditions.

Separator 11 is a pressure vessel within which a nozzle (not shown) connected to feed line 10 evenly distributes the lower density supercritical solvent and the higher density DAO across a horizontal cross-section of the separator. In this way, the lower density supercritical solvent separates from the higher density DAO permitting each fluid to be piped away independently.

As indicated above, nozzles of the prior art introduce turbulence into the fluid in separator 11 which results in mixing of the supercritical solvent with the DAO. This problem is substantially eliminated with the nozzle configurations of the present invention described below.

Figures 3, 3A, 3B:
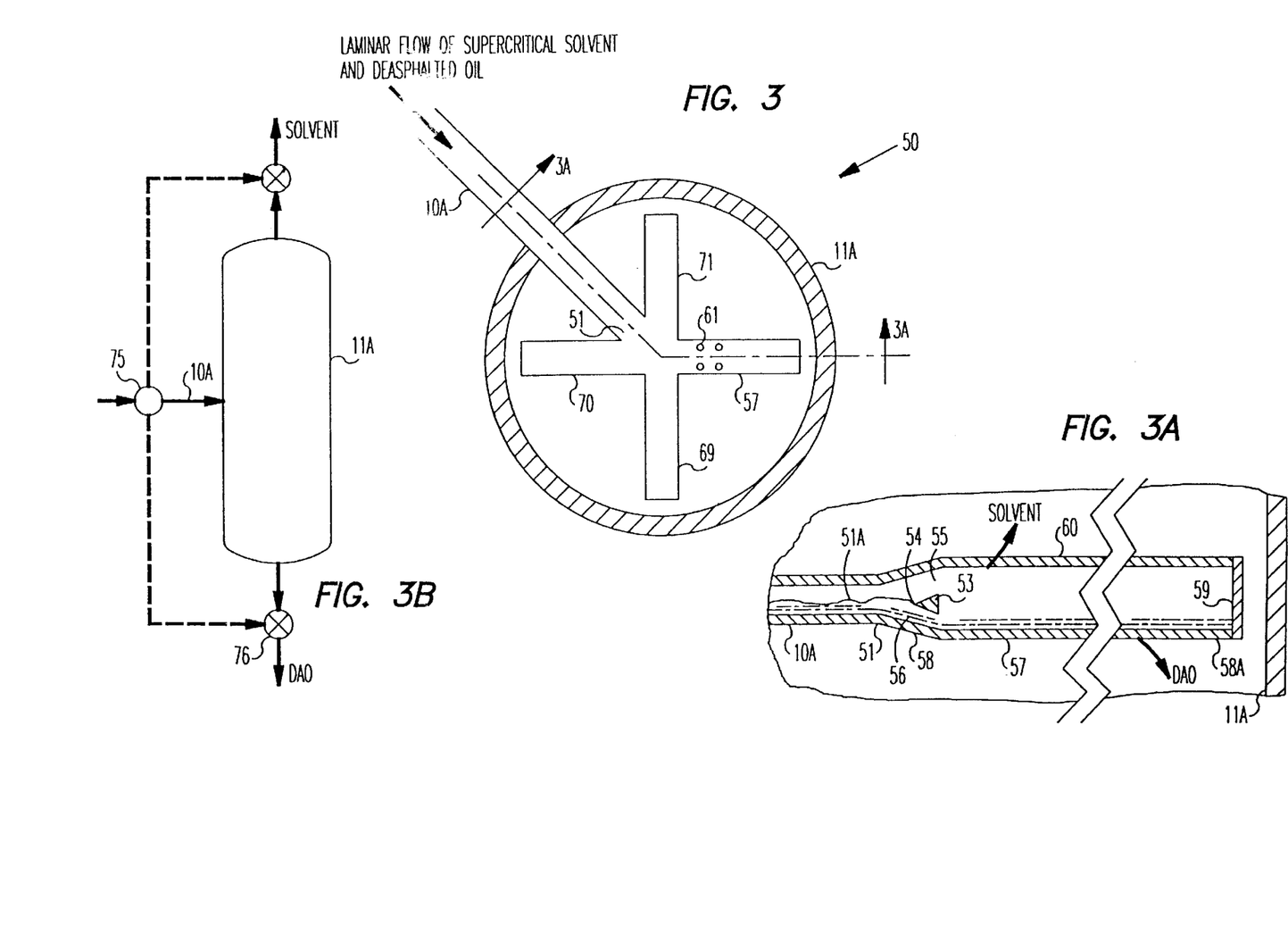
FIG. 3 is a schematic plan view of a supercritical solvent recovery separator according to the present invention showing a plurality of horizontally disposed tubes that receives a feed of supercritical solvent and deasphalted oil.
FIG. 3A is a sectional view taken along the line 3A—3A of FIG. 3.
FIG. 3B is a schematic diagram showing a control system for maintaining a minimum amount of deasphalted oil in the solvent output of the separator, and a minimum amount of solvent in the deasphalted oil output.

Apparatus according to the present invention for separating solvent in a feed of lighter solvent and heavier deasphalted oil produced in a deasphalting process is shown in FIG. 3 and designated by reference numeral 50. Apparatus includes a feed line (not shown) like line 10 in FIG. 1, and heat exchangers (not shown) like heat exchangers 7 and 9 in FIG. 1, for receiving the feed and producing a main stream of fluid containing supercritical solvent and deasphalted oil. The feed line is connected to inlet line 10A that is substantially horizontally disposed and receives the main stream. Inlet line 10A is constructed and arranged to produce at outlet 51 of line 10A, two phase laminar flow of the main stream. Such a flow is established by ensuring that the cross-sectional area of line 10A is large enough for the flow of supercritical solvent and DAO to be in the laminar flow region. As a consequence of having a two-phase laminar flow in line 10A, the lighter supercritical solvent is separate from and floats on the heavier deasphalted oil establishing interface 51A lying in a horizontal plane as indicated in FIG. 3A.

Apparatus 50 includes at least one wedge shaped divider member 52 (see FIG. 2) at outlet 51 of line 10A, the member facing the stream of supercritical solvent and DAO and having tapered leading edge 53 whose apex 54 can be located at the same level as interface 51A. As shown in FIG. 3A, apex 54 divides the stream of supercritical solvent and DAO into upper flow stream 55 containing essentially only supercritical solvent, and lower flow stream 56 containing deasphalted oil with a significantly reduced amount of solvent.

Apparatus 50 also includes a substantially horizontal, axially extending tube 57 located in pressure vessel 11A and having one end 58 for internally receiving the upper flow stream of supercritical solvent and the lower flow stream of DAO. Opposite end 58A of tube 57 is capped at 59. Upper surface 60 of the tube has holes 61 distributed axially along the length of the tube for effecting egress of supercritical solvent in upper flow stream 55. Lower surface 62 of the tube is apertured for effecting egress of DAO in lower flow stream 56.

Figure 4:
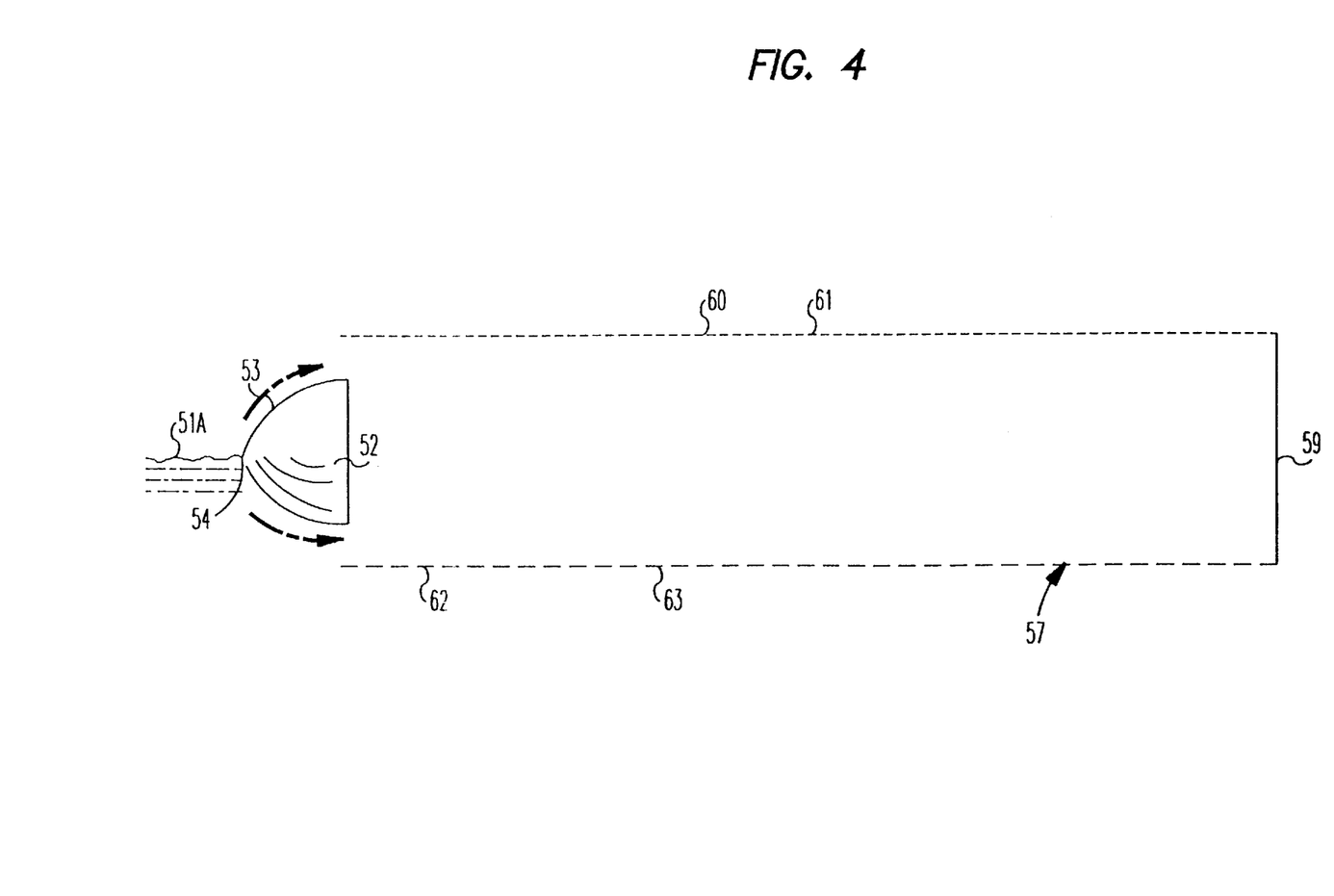
FIG. 4 is a side elevation in section of one of the tubes shown in FIG. 3.

In one arrangement, as shown in FIG. 4, lower surface 62 of the tube has holes 63 distributed axially along the length of the tube. In another arrangement, as shown in FIG. 5, axially extending, horizontally disposed baffle 64 in the tube downstream of member 52 divides the tube into upper chamber 65 into which upper stream 55 flows, and lower chamber 66 into which lower stream 56 flows.

Figure 5:
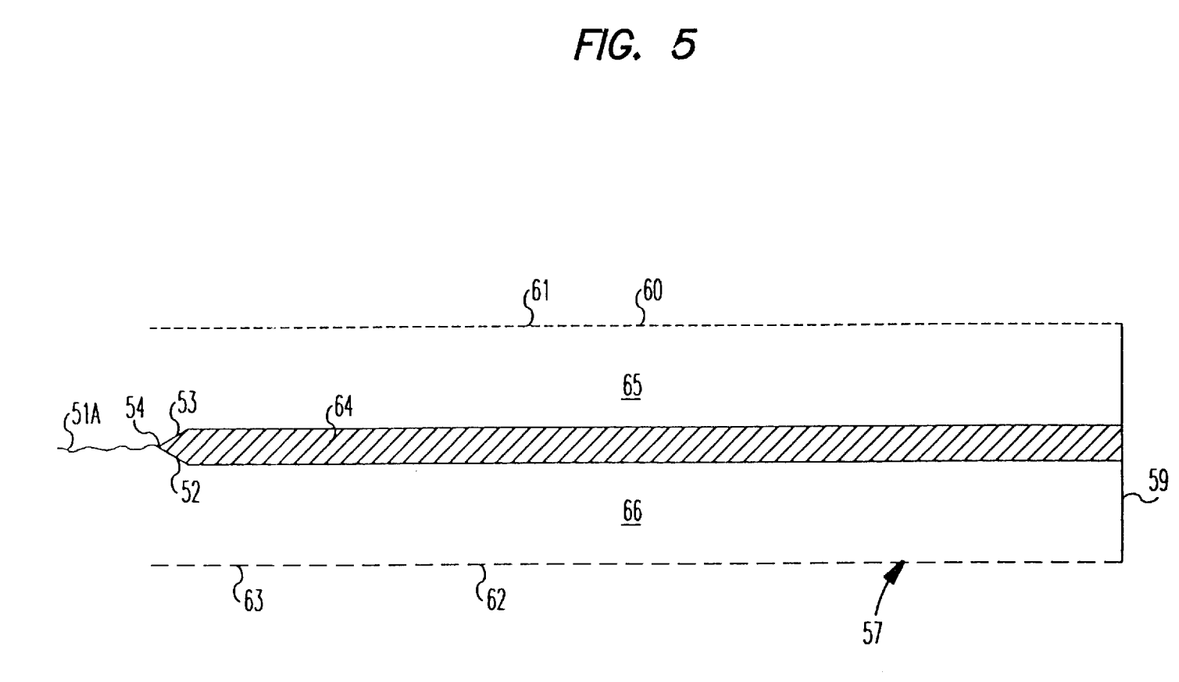
FIG. 5 is a side elevation in section of a modification of the tube shown in FIG. 4.
Figure 6:
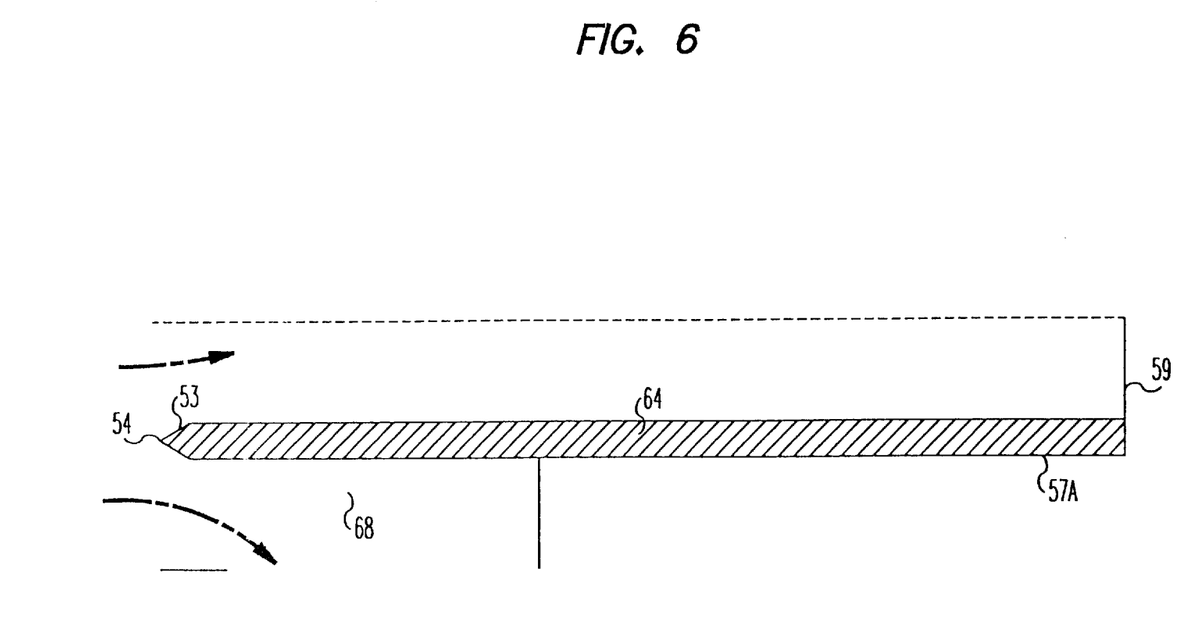
FIG. 6 is a side elevation in section of a further modification of the tube shown in FIG. 4.

Preferably, in each of the arrangements shown in FIGS. 4 and 5, lower surface 62 of the tubes has holes 63 distributed axially along the length of the tube. Alternatively, lower surface 62 of the tube may be apertured as indicated at 68 in FIG. 6 for effecting egress of fluid from the tube.

In a preferred arrangement, apparatus 50 includes three additional tubes like tube 57, namely tubes 69, 70, and 71 arranged at a 90° angle to each other and intersecting at outlet 51 of line 10A as shown in FIG. 3. Outlet 51 is axially located within vessel 11A and forms a common inlet to each of the tubes which extend radially in a common plane from outlet 51 toward the walls of the vessel. A wedge-like divider member is associated with each tube at the inlet thereof for directing the supercritical solvent toward the top of each tube, and the DAO toward the bottom. Preferably, holes 61 in the top surface of each tube, through which the supercritical solvent exits, are evenly distributed along the length of the tube. Egress of the DAO from the tubes can be at either axial end, or uniformly along the length.

While four tubes are shown in FIG. 3, more than or less than four tubes can be used. Moreover, in another alternative arrangement (not shown), a hollow, cylindrical, horizontally disposed disk-like member whose horizontal cross-section substantially fills the pressure vessel may be used instead of separate tubes. In such case, the disk-like member would be apertured uniformly on the top and bottom, and be provided with a centrally located plate that divides the member into upper and lower chambers for respectively receiving the separated supercritical solvent and DAO.

In accordance with the present invention, the dimensions of tubes 57, 69, 70, and 71, as well as the dimensions of the horizontally disposed disk-like member previously mentioned, should be large enough for the flow of supercritical solvent and the DAO to be in the laminar regime.

In the event of variations in the elevation of interface 51A between the supercritical solvent and DAO in inlet line 10A, due, for example, to variations in throughput, the leading edge of member 53, or of baffle 64, may become misaligned with interface 51A. This will cause diversion of some DAO into upper chamber 65 of a tube (or the upper chamber of the disk-like member), or the diversion of some of the supercritical solvent into the lower chamber 66 of a tube (or the lower chamber of the disk-like member). Small diversions do not affect the operation of the invention; but in the event the variations in elevation are large, the approach shown in FIG. 3B can be employed to minimize the effect of such variations.

In FIG. 3B, sensor 75 monitors the interface level in inlet line 10A using, for example, a differential pressure transmitter, a sonic level detector, a float-type level detector, or a nuclear-based level detector. Sensor 75 generates a signal indicative of the magnitude and direction of the difference between a set point level and the actual level. Such signal is used to control valve 76 in the DAO line at the bottom on vessel 11A. Thus, if the interface level drops below edge 54 of member 53, sensor 76 would signal valve 76 to reduce the flow of DAO, etc.

Figure 7:
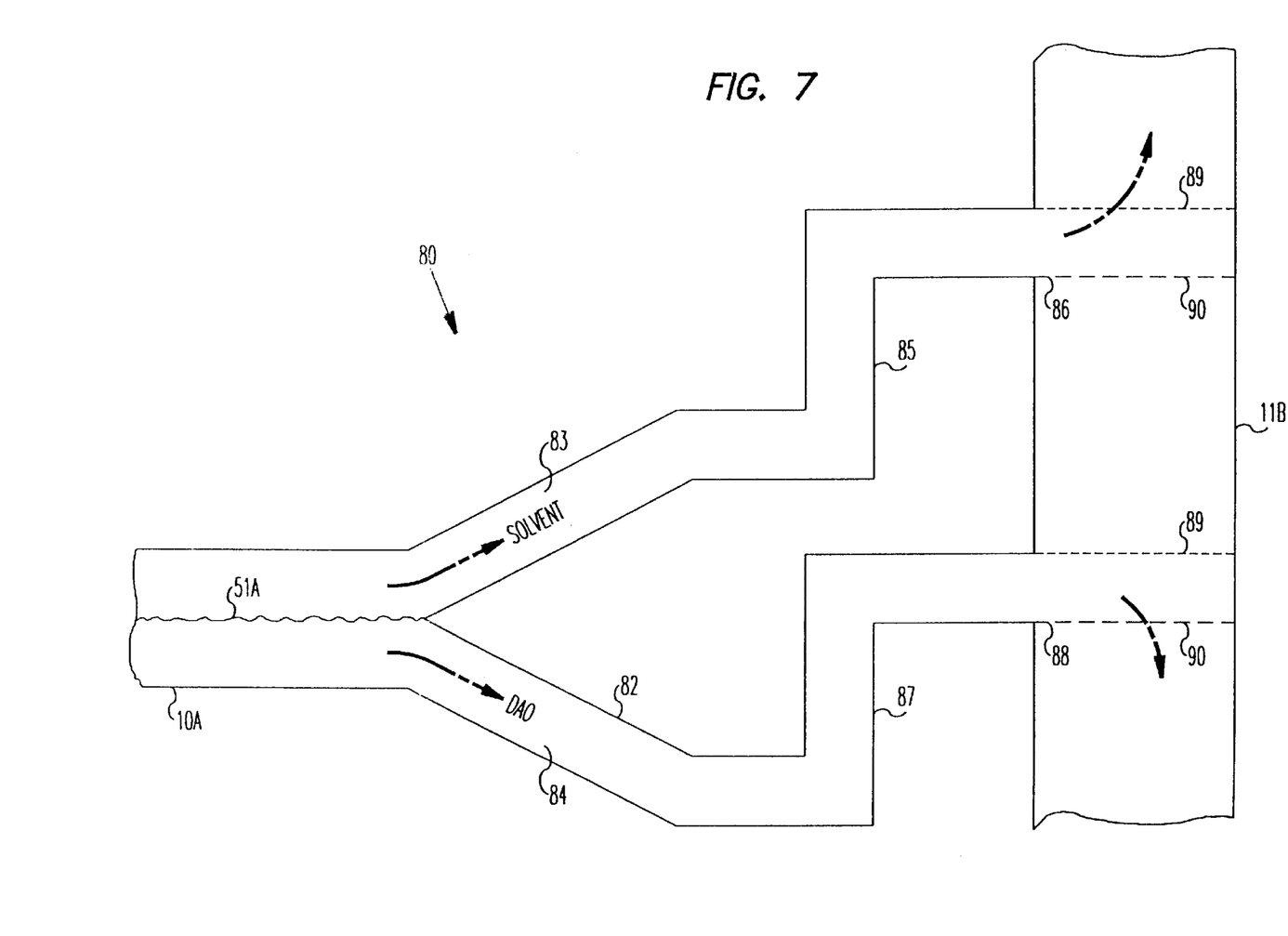
FIGS. 7 and 8 are side elevations of another embodiment of the present invention.

Embodiment 80 of the invention shown in FIG. 7 includes inlet tube 10A that contains the main stream of supercritical solvent and DAO flowing in a two phase regime with the lighter supercritical solvent floating on the heavier DAO. Interface 51A between supercritical solvent and the DAO is substantially aligned with apex 81 of wedge-shaped divider member 82 positioned at the outlet of tube 10A and divides the flow into upper stream 83 containing substantially only supercritical solvent and lower stream 84 containing substantially only DAO. Upper stream 83 flows in conduit 85 to substantially horizontally disposed axially extending tube 86 that projects into vertical separator column 11B which functions like separator 11A previously described; and lower stream 84 flows in conduit 87 to substantially horizontally disposed axially extending tube 88 that projects into separator column 11B.

Any DAO in the fluid flowing in tube 86 will separate from the supercritical solvent and flow below the solvent; and any supercritical solvent in the fluid flowing in tube 88 will separate from the DAO and flow above the DAO. The upper surface of each of tubes 86 and 88 have holes 89 distributed axially along the length of the tube for effecting egress of supercritical solvent, and the lower surface of each tube has apertures 89 for effecting egress of DAO from the tube. Any DAO in stream 83 will separate from the solvent as the stream flows in tube 86, and will flow downwardly through holes 90. Any solvent in stream 84 will separate from the DAO as the stream flows in tube 88, and will flow upwardly through holes 90. Although tubes 86 and 88 may be positioned at substantially the same elevation in separator column 11B, it is preferred that the tubes be positioned at different elevations as shown in FIG. 7.

Figure 8:
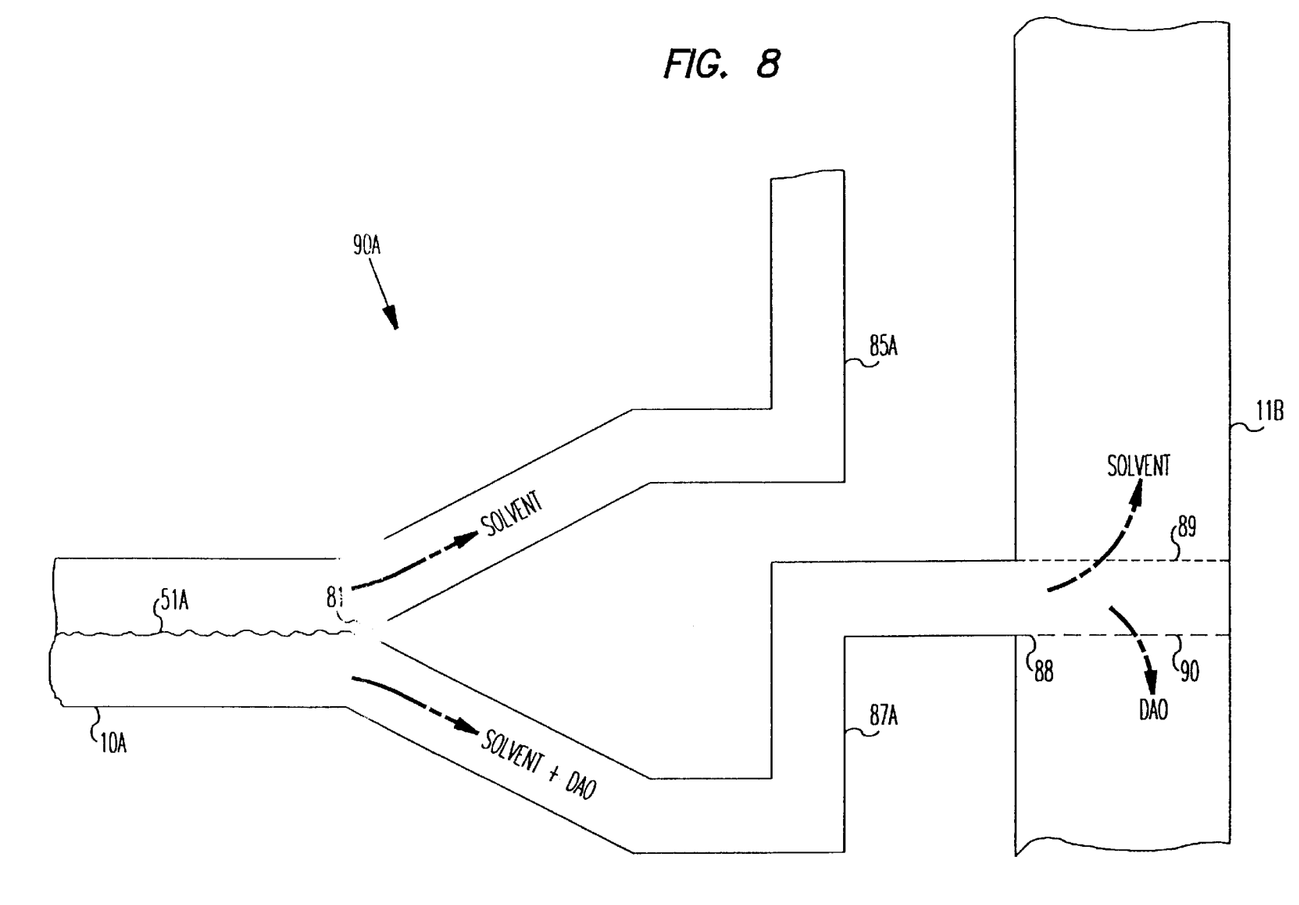

Embodiment 90A shown in FIG. 8 is a modification of embodiment 80 and is ideally suited for a situation in which the elevation of interface 51A is below apex 81 ensuring that only supercritical solvent flows in conduit 85A. In such case, a two phase flow of solvent and DAO will flow in tube 88 with the solvent exiting through holes 89 and the DAO exiting though holes 90. The solvent in column 11B can be combined with the solvent in conduit 85A and returned to the asphaltene separator after suitable cooling as shown in FIG. 1.

Figure 9:
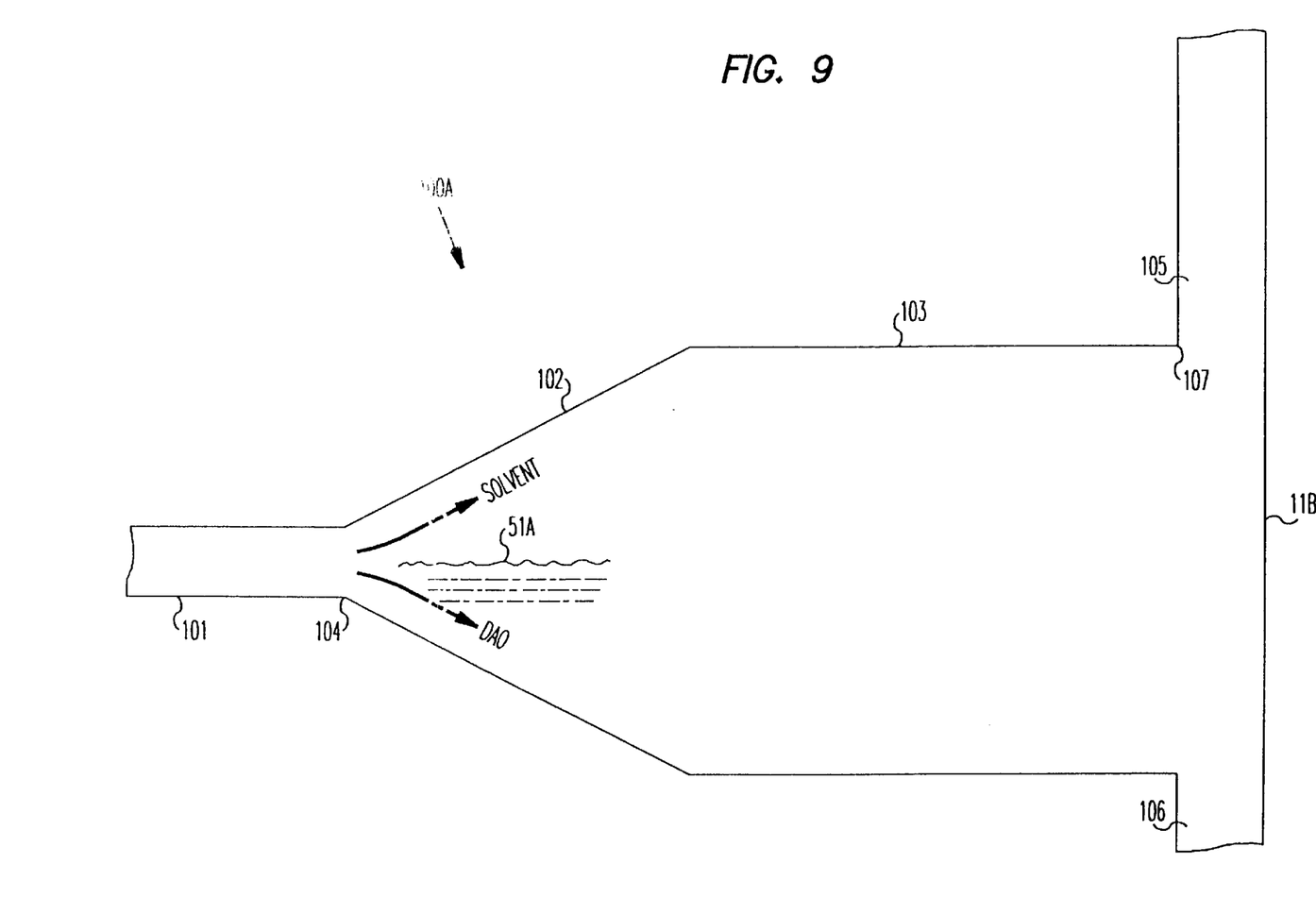
FIGS. 9–11 are side elevations of a further embodiment of the present invention.
Figure 10:
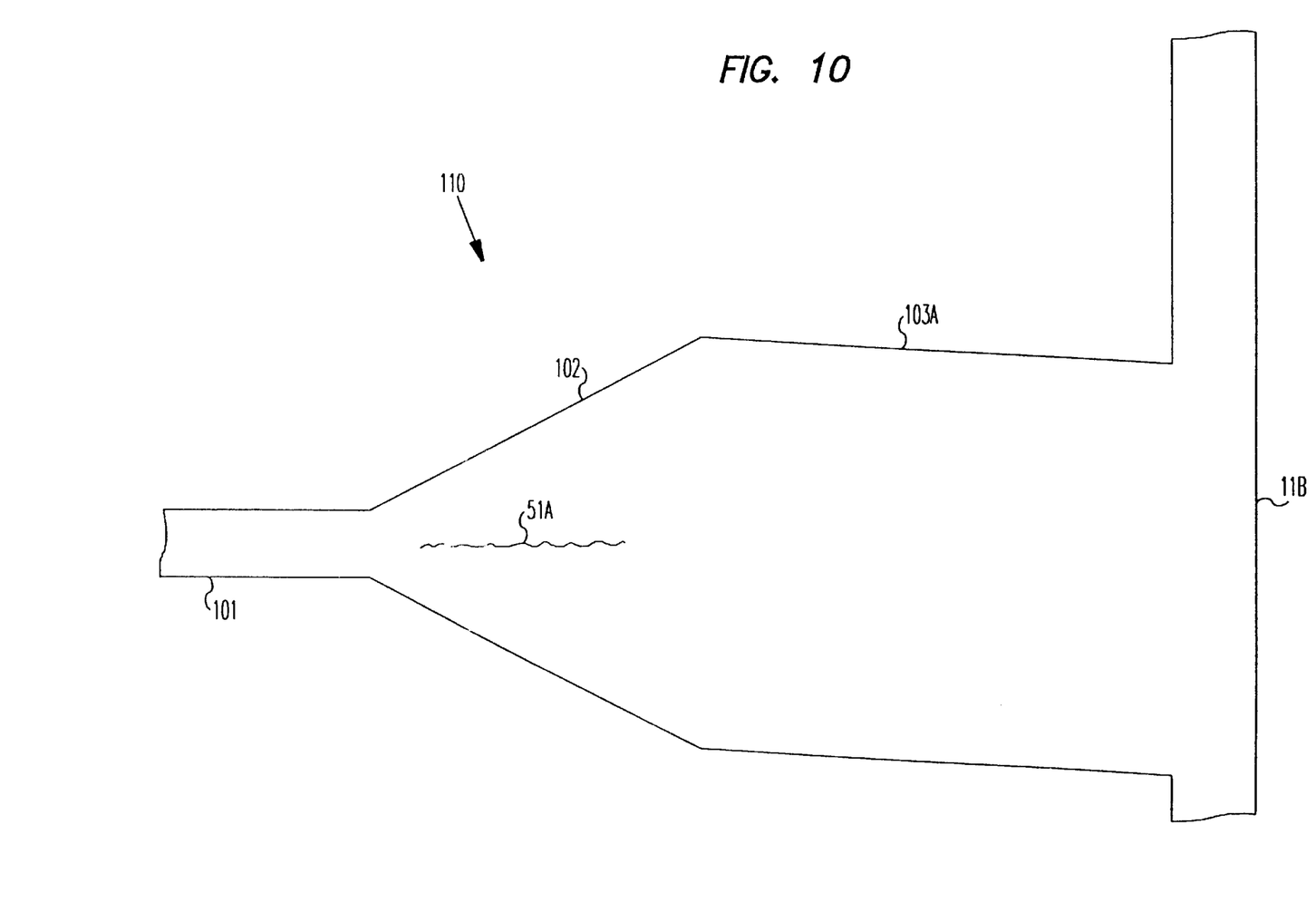

The embodiments shown in FIGS. 9 and 10 eliminate the need for a wedge-shaped divider member for dividing the two-phase flow of supercritical solvent and DAO into separate flow paths. Embodiment 100A in FIG. 9 includes feed line 101 which contains the feed stream of supercritical solvent and DAO flowing in a two phase regime. Line 101 is connected, though conically shaped transition 102 to inlet line 103 which has a cross-section much larger than the cross-section of feed line 101. Specifically, apex 104 of conically shaped transition 102 portion is connected to feed line 101, apex 104 lying in alignment with the axes of feed line 101 and inlet line 103 which is cylindrical. In this embodiment, the axis of line 103 is horizontal. Because the cross-section of line 103 is much larger than the cross-section of feed line 101, the flow of fluid in the inlet line is slowed, and is laminar. Separation of the flow into two phases occurs in line 103.

Downstream end 107 of inlet line 103 connects to column 11B and is thus considered to be closed. First outlet line 105 near the top of downstream end 107 serves to effect egress of supercritical solvent from line 103, and second outlet line 106 near the bottom of downstream end 107 serves to effect egress of DAO.

Embodiment 110 in FIG. 10 is a modification of embodiment 100A and is the same except that the axis of inlet line 103A is inclined relative to the horizontal instead of being horizontal as is the case with inlet line 103 in FIG. 9. Specifically, the flow path of fluid in inlet 103A is tilted downwardly. Preferably, the angle of inclination is 5°–15°.

Figure 11:
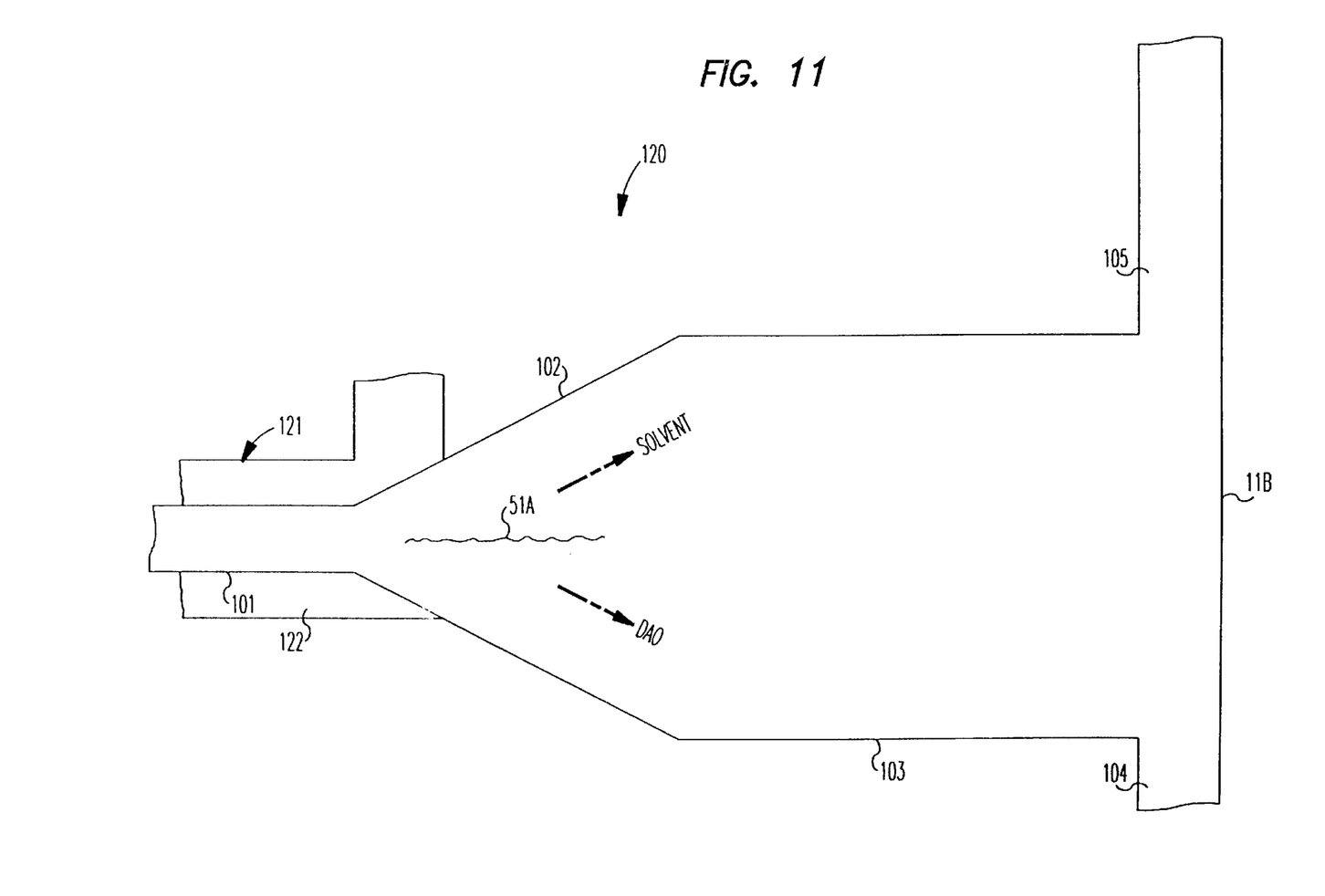

Embodiment 120 in FIG. 11 is a further modification of embodiment 100 in that means are provided for raising solvent in feed line 101 to its supercritical state. Specifically, embodiment 120 includes heat exchanger 121 in the form of shell 122 that surrounds feed line 101. Shell 122 contains a heat transfer fluid that serves to add sufficient heat to the mixture of solvent and DAO flowing in feed line 101 so that the solvent becomes supercritical. Heat exchanger 121 thus functions like heat exchangers 7 and 9 in FIG. 1.

Figure 12:
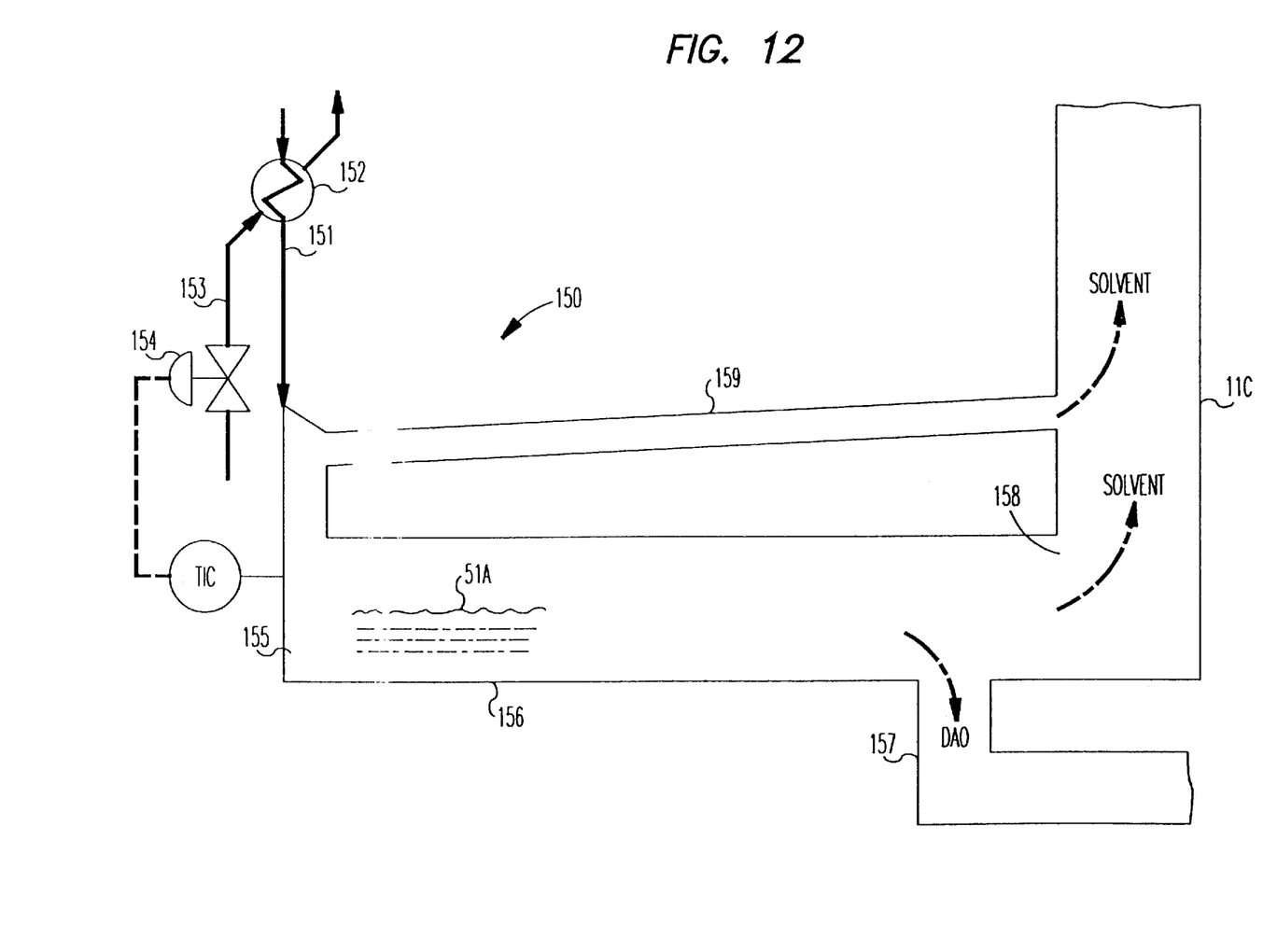
FIGS. 12–14 are side elevations of still a further embodiment of the present invention.
Figure 13:
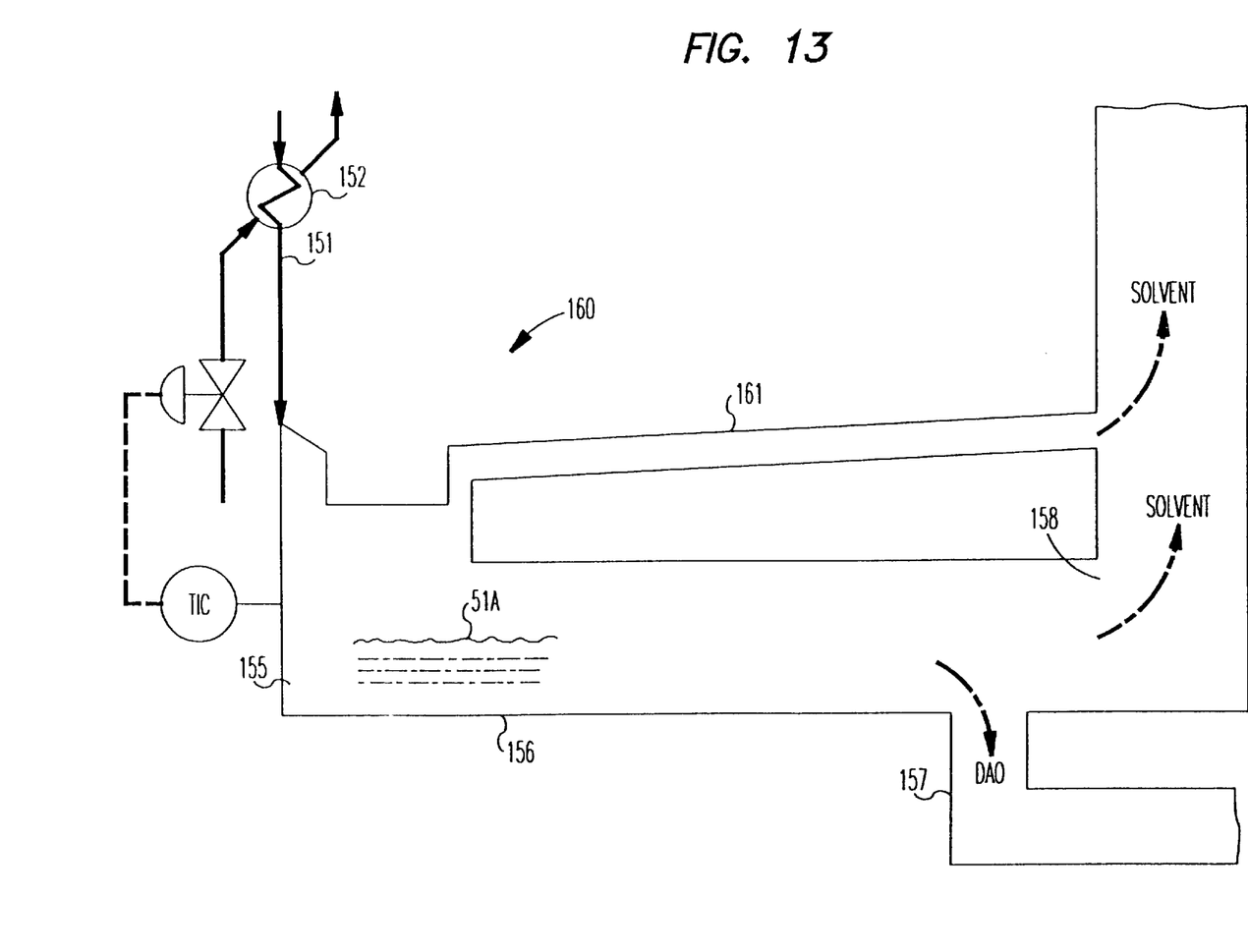
Figure 14:
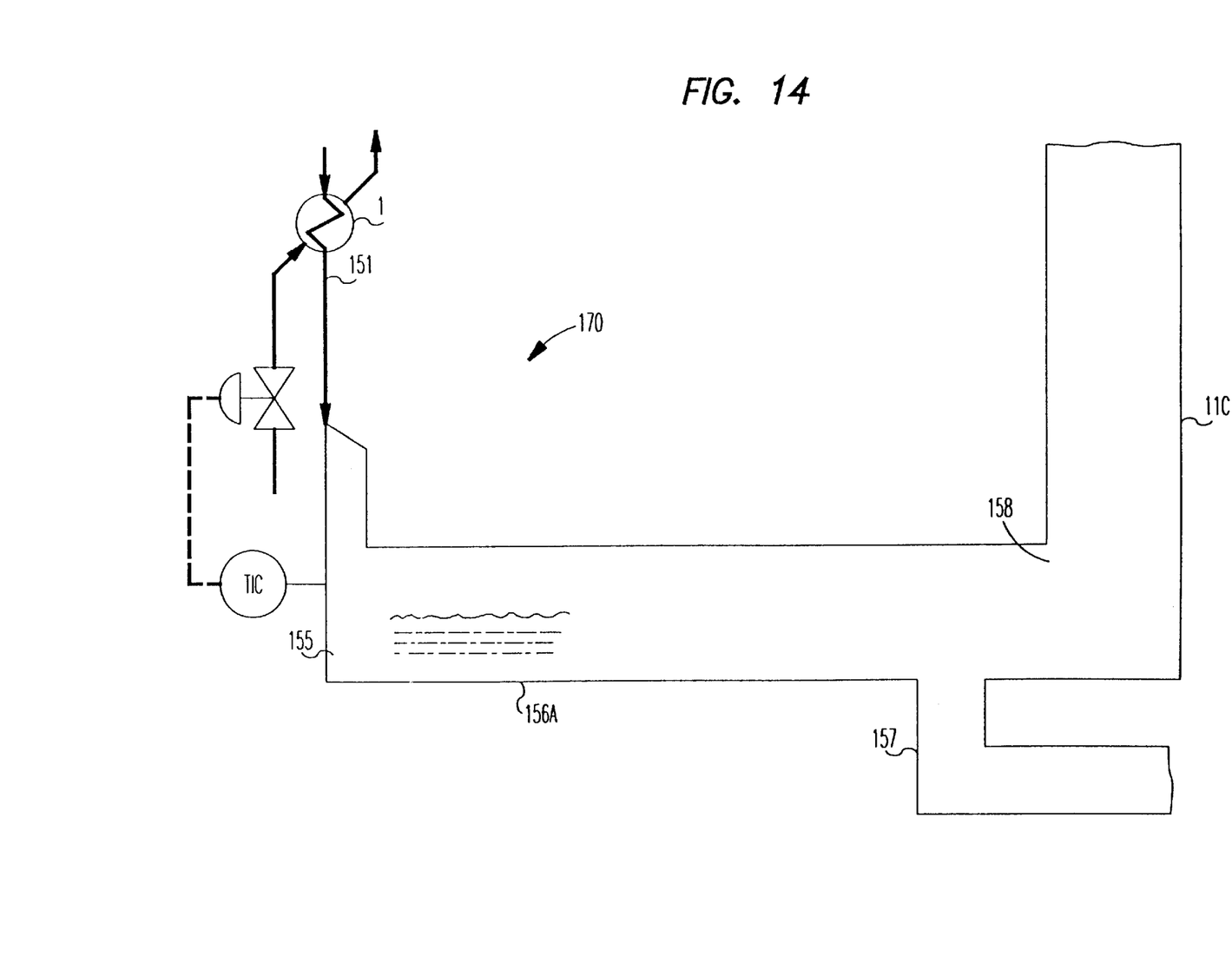

In the previously described embodiments, the feed line and inlet line to the separator are horizontally disposed. In the embodiments of FIGS. 12–14, the feed line is vertically oriented. In embodiment 150 shown in FIG. 12, feed line 151 is vertical; and a mixture of solvent and DAO is heated by heat exchanger 152 using hot thermal fluid in line 153. The temperature of the mixture is controlled by the set point of regulator 154 as described in connection with FIG. 2.

Embodiment 150 includes 90° elbow 155 that connects vertical feed line 151 to horizontally disposed inlet line 156 that functions like inlet line 51 of the previously described embodiment. Specifically, embodiment 150 includes outlet line 157 connected to the bottom of inlet line 156, but downstream of elbow 155, and further outlet line 158 connected to the top of the inlet line also downstream of the elbow. Auxiliary conduit 159 connected to inlet line 151 at the outlet of heat exchanger 152 carries supercritical solvent to separator column 11C, while any DAO in conduit 159 separates and travels downwardly in column 11C joining DAO that exits inlet line 156 via outlet line 157.

A modification of embodiment 150 is shown at 160 in FIG. 13. In embodiment 160, auxiliary line 161 is connected to the top of inlet line 156 downstream of elbow 155 instead of to feed line 151 as in embodiment 150.

Embodiment 170 shown in FIG. 14 is a further modification of embodiment 150 in that the auxiliary line in embodiment 150 has been eliminated. In embodiment 170, inlet line 156A connected to elbow 155 serves to effect laminar flow of the supercritical solvent and DAO such that two-phase separation takes place. The lighter solvent is drawn off at the top of the outlet 158, and the heavier DAO is drawn off though line 157 at the bottom of inlet line 156A.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. Apparatus for separating solvent in a feed of lighter solvent and heavier deasphalted oil produced in a deasphalting process, said apparatus comprising:
    a) a feed line for receiving said feed and constructed and arranged to produce a main stream of fluid containing supercritical solvent and deasphalted oil;
    b) a substantially horizontally disposed inlet line for receiving said main stream, and constructed and arranged to produce at the outlet of said inlet line, two phase laminar flow of said stream such that the lighter supercritical solvent is substantially separate from and floats on the heavier deasphalted oil.

2. Apparatus according to claim 1 including at least one divider member at the outlet of said inlet line, said member facing said stream and having a tapered leading edge whose apex can be located at substantially the interface between supercritical solvent and the deasphalted oil for dividing said stream into an upper flow stream containing essentially only supercritical solvent, and a lower flow stream containing essentially only deasphalted oil.

3. Apparatus according to claim 2 including at least one substantially horizontal, axially extending tube having one end for internally receiving said upper flow stream and said lower flow stream and having a capped opposite end, the upper surface of said tube having holes distributed axially along the length of the tube for effecting egress of fluid from said upper flow stream, and the lower surface of said tube being apertured for effecting egress of fluid from said lower flow stream.

4. Apparatus according to claim 3 wherein said lower surface of said tube has holes distributed axially along the length of the tube.

5. Apparatus according to claim 3 including an axially extending baffle that divides said tube into an upper chamber into which flows said upper flow stream, and a lower chamber into which flows said lower flow stream.

6. Apparatus according to claim 5 wherein said lower surface of said tube has holes distributed axially along the length of the tube.

7. Apparatus according to claim 2 including a first substantially horizontally disposed axially extending tube for receiving said upper flow stream, and a second substantially horizontally disposed axially extending tube for receiving said lower flow stream, the upper surface of each tube having holes distributed axially along the length of the tube for effecting egress of fluid, and the lower surface of each tube being apertured for effecting egress of fluid from the tube.

8. Apparatus according to claim 7 wherein said first and second tubes are at the same elevation.

9. Apparatus according to claim 2 including an axially extending tube for receiving said lower flow stream, the upper surface of said tube having holes distributed axially along the length of the tube for effecting egress of fluid, and the lower surface of said tube being apertured for effecting egress of fluid from the tube.

10. Apparatus according to claim 1 wherein said inlet line has a cross-section much larger than the cross-section of said feed line for slowing the flow of fluid in said inlet line, the downstream end of said inlet line being closed, and including a first outlet line near the top of said downstream end, and a second outlet line near the bottom of said downstream end.

11. Apparatus according to claim 1 wherein said inlet line has a conically shaped portion whose apex is connected to said feed line, and a cylindrically downstream portion with a cross-section much larger than the cross-section of said feed line.

12. Apparatus according to claim 11 wherein the axis of said downstream portion is horizontal.

13. Apparatus according to claim 11 wherein the axis of said downstream portion is inclined relative to the horizontal.

14. Apparatus according to claim 12 wherein the angle of inclination is 5°–15°.

15. Apparatus according to claim 11 including a heat exchanger shell that surrounds said feed line for containing a heat transfer fluid that serves to heat the fluid flowing in said feed line.

16. Apparatus according to claim 1 wherein said feed line is vertically oriented, and said apparatus includes a 90° elbow that connects the feed line to said inlet line.

17. Apparatus according to claim 16 including an outlet line connected to the bottom of said inlet line downstream of said elbow, and a further outlet line connected to the top of said inlet line downstream of said elbow.

18. Apparatus according to claim 17 including an auxiliary line connecting said feed line to the outlet line connected to the top of said outlet line.

19. Apparatus according to claim 17 including an auxiliary line connecting the top of said inlet line to the outlet line connected to the top of said inlet line, said auxiliary line being connected to the top of said inlet line at a location upstream of the location at which said outlet line is connected to the top of said inlet line.

20. Apparatus for use with a supercritical solvent recovery separator that is a part of a deasphalting process which produces a fluid stream of deasphalted oil and supercritical solvent, said apparatus comprising:

a) an inlet line carrying said stream and constructed and arranged to produce in said line, two phase laminar flow of said stream such that the lighter supercritical solvent is separate from and floats on the heavier deasphalted oil;

b) a nozzle in said separator having a junction connected to said inlet line;

c) said junction being constructed and arranged to separate said fluid into an upper flow path containing essentially only supercritical solvent, and a lower flow path containing essentially only deasphalted oil.

21. Apparatus according to claim 20 wherein said nozzle comprises:

a) a plurality of tubes each having one end connected to said junction located centrally in said separator, and extending radially from said junction and terminating in a free end that is capped;

b) each tube having apertures only along the top and bottom thereof for effecting egress of supercritical solvent through the apertures on the top, and for effecting egress of deasphalted oil through the apertures in the bottom.

* * * * *